United States Patent [19]

Uchida et al.

[11] Patent Number: 5,039,185
[45] Date of Patent: Aug. 13, 1991

[54] HOMEOTROPIC LIQUID CRYSTAL DISPLAY DEVICE

[75] Inventors: Tatsuo Uchida, 1-16-13-42 Maruyama, Tagajo, Miyagi; Kazuo Ariga; Seiyu Kuniyasu, both of Kawasaki, all of Japan

[73] Assignees: Stanley Electric Co., Ltd., Tokyo; Tatsuo Uchida, Tagajo, both of Japan; Commissariat a l'Energie Atomique, Paris, France; Shingijutsu Kaihatsu Jigyodan, Tokyo, Japan

[21] Appl. No.: 374,751

[22] Filed: Jul. 3, 1989

[30] Foreign Application Priority Data

Jul. 4, 1988 [JP] Japan .................................. 63-165072

[51] Int. Cl.⁵ .............................................. G02F 1/13
[52] U.S. Cl. ......................................... 359/75; 359/92
[58] Field of Search ........... 350/339 R, 347 R, 347 E, 350/337, 351

[56] References Cited

U.S. PATENT DOCUMENTS

| | | | |
|---|---|---|---|
| 4,385,806 | 5/1983 | Fergason | 350/347 R |
| 4,620,772 | 11/1986 | Sugimoto et al. | 350/337 |
| 4,701,028 | 10/1987 | Clerc et al. | 350/337 |
| 4,909,606 | 3/1990 | Wada et al. | 350/351 |
| 4,936,654 | 6/1990 | Suzaki et al. | 350/347 R |

FOREIGN PATENT DOCUMENTS 0239433 9/1987 European Pat. Off. .

Primary Examiner—Rolf Hille
Assistant Examiner—S. V. Clark
Attorney, Agent, or Firm—Cushman, Darby & Cushman

[57] ABSTRACT

A homeotropic liquid crystal display device compensated for the anisotropy of the homeotropically oriented nematic liquid crystal layer, by anisotropy compensating means comprising at least two anisotropic (e.g. uniaxial) films having their optic axes disposed to form a right angle in a plane parallel to the substrate to form an optically negative activity in the direction perpendicular to the substrate. This optically negative activity is so selected to compensate the positive optical anisotropy of the nematic liquid crystal when oriented homeotropically in the absence of electric field.

5 Claims, 5 Drawing Sheets

HOMEOTROPIC LIQUID CRYSTAL DISPLAY DEVICE

BACKGROUND OF THE INVENTION

This invention relates to a liquid crystal display device, and more particularly to a homeotropic liquid crystal display device in which the optical anisotropy of a homeotropically oriented nematic liquid crystal layer is compensated for.

The homeotropic liquid crystal display device has been utilized and developed in various ways as liquid crystal display devices capable of representing clear displays.

A typical homeotropic liquid crystal display device comprises a homeotropic liquid crystal cell disposed between a pair of crossed polarizers.

Homeotropic liquid crystal molecules are oriented normal to the substrate surface (i e. homeotropically) in the absence of an electric field. Then, the liquid crystal layer does not change the polarization state of the incident light. Thus, the incident light is cut off by the crossed polarizers, exhibiting "dark" OFF state.

When, for example, an a.c. electric field is applied to the liquid crystal layer, the liquid crystal molecules change their orientations. Then, there occurs annihilation of polarization or birefringence. Then, the incident light can transmit through the crossed polarizers to exhibit "bright" ON state.

When a cell of OFF state is seen along a direction normal or orthogonal to the substrate a substantially perfect dark state is obtained. However, with respect to the lights incident on the cell along directions off-set from the normal to the substrate, a perfect dark state can no more be obtained. Therefore, good visual recognition range of incidence angle is very narrow.

Generally, the most influensive factor for the grade of the display of the transmission type liquid crystal display device is contract.

For increasing contrast, it is necessary to decrease the light leakage in the dark state as far as possible. Thus, if a sufficiently dark state cannot be obtained in directions off set from the normal directions, as described above, the display grade should be extremely lowered.

SUMMARY OF THE INVENTION

An object of this invention is to provide a home© tropic liquid crystal display device having a wide recognition range of incident angle.

In accordance with an aspect of this invention, there is provided a homeotropic liquid crystal display device in which anisotropy compensating means is inserted between a homeotropic liquid crystal cell containing a nematic liquid crystal molecules having a negative dielectric anisotropy and at least one of a pair of polarizers. In the anisotropy compensating means, at least two anisotropic films, such as uniaxial films, are disposed in a plane or planes parallel to the substrate, with their refractive index axes relatively rotated to make a right angle to establish a negative optical anisotropy in the direction normal to the substrate, which compensates for the optical anisotropy of the nematic liquid crystal molecules oriented homeotropically under the absence of voltage, which is a positive optical anisotropy having an axis normal to the substrate.

When the nematic liquid crystal layer becomes a uniaxial anisotropic medium with the axis oriented normal to the substrate to establish a positive optical anisotropy, the negative optical anisotropy of the anisotropy compensating means compensates for the positive optical anisotropy of the liquid crystal layer, thereby reducing the leakage light in a finite incidence angle region. Therefore, a liquid crystal display device of wide recognition range of incident angle can be provided.

BRIEF DESCRIPTION OF THE DRAWINGS

FIGS. 2A and 2B are schematic perspective views for illustrating the operation of the liquid crystal display device as shown in FIG. 1A, wherein FIG. 2A illustrates an "ON" state and FIG. 2B illustrates an "OFF" state.

FIGS. 3A to 3D are diagrams for illustrating the structure and the function of the anisotropy compensating means shown in FIGS. 1A, 1B, and 1C, wherein FIG. 3A is a diagram of parts, FIG. 3B illustrates the refractive index components of the parts, FIG. 3C illustrates an assembled state for the embodiments of FIGS. 1A and 1B, and FIG. 3D illustrates the composite refractive index ellipsoid of the anisotropy compensating means.

FIGS. 7A, 7B and 7C show a homeotropic liquid crystal display device according to the prior art, wherein FIG. 7A is a cross-sectional view, FIGS. 7B and 7C are schematic perspective views for illustrating the ON and OFF operation of the homeotropic liquid crystal display device of FIG. 7A.

Figure 1A:
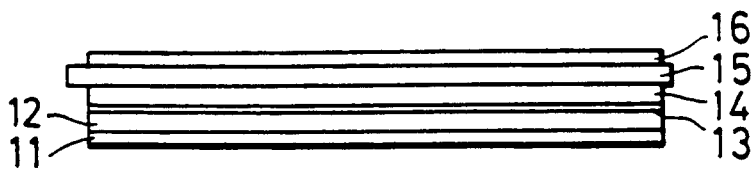
FIGS. 1A, 1B and 1C are cross-sectional views of three dispositions of liquid crystal display devices according to embodiments of this invention.

In the drawings, reference symbols 1 and 6 denote polarizers, 2 and 4 substrates, a liquid crystal layer, $N_0$ refractive index of the liquid crystal layer for ordinary light ray, $N_e$ refractive index of the liquid crystal layer for extra ordinary light ray, P1 and P2 axes of polarization in the polarizers, 11 and 16 polarizer plates (polarizers), 12 and 14 substrates, 13 a homeotropic liquid crystal layer, 15 anisotropy compensating means, $n_1$, $n_2$ and $n_3$ refractive indices of anisotropic film, and $n_1'$, $n_2'$ and $n_3'$ composite refractive indices of anisotropy compensating means.

DESCRIPTION OF PREFERRED EMBODIMENTS

First, the prior art liquid crystal display device will be analyzed. Description will be made taking a example of a homeotropic liquid crystal display device, referring to FIGS. 7A, 7B and 7C.

Figure 7A:

The homeotropic liquid crystal display device has a structure in which a liquid crystal cell is sandwiched between a pair of polarizer plates and 6 as shown in FIG. 7A. The liquid crystal cell has a structure in which a layer 3 of nematic liquid crystal having a negative dielectric anisotropy is sealed between a pair of substrates 2 and 4. Thin film transistors and display electrodes may be formed on one substrate and an opposing common electrode may be formed on the other substrate.

Figure 7B:
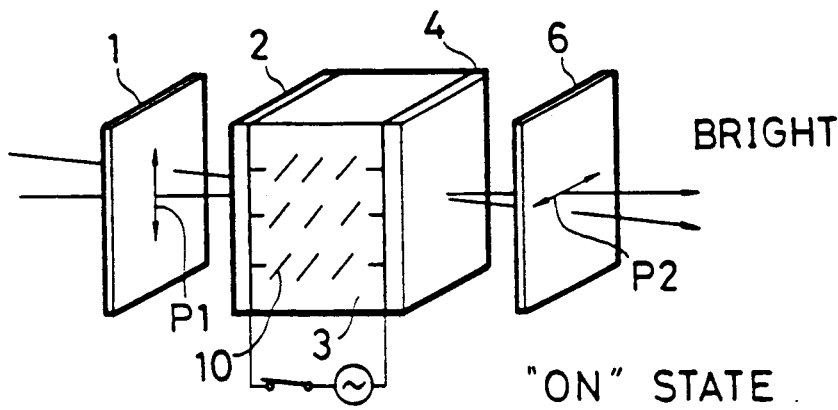
Figure 7C:
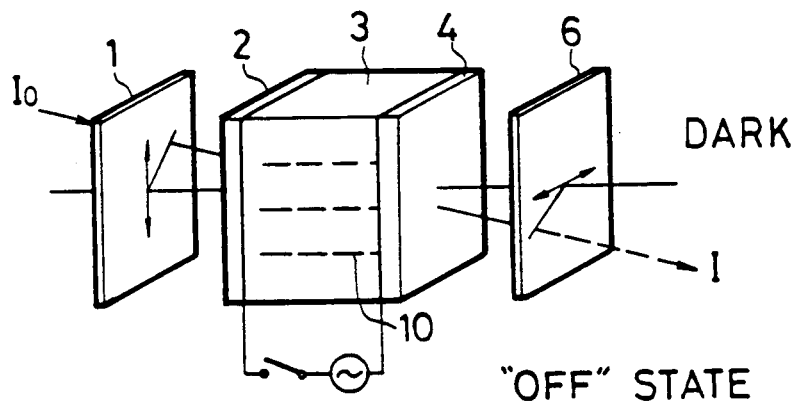

FIGS. 7B and 7C respectively show the states of a cell of the homeotropic liquid crystal display device in the ON state which is under the application of an electric field and in the OFF state which is in the absence of an electric field.

The liquid crystal display system illustrated in FIGS. 7B and 7C is a negative type homeotropic system (the cell becomes bright when a voltage is applied), wherein polarization axes P1 and P2 of a pair of polarizer plates 1 and 6 are orthogonally crossed.

In the OFF state as shown in FIG. 7C, liquid crystal molecules 10 are oriented along a direction normal to the substrate surface. An incident light going along the optical axis becomes a vertically linearly polarized light in the polarizer plate 1, enters the liquid crystal layer 3 from the side of the substrate 2, is transmitted through the liquid crystal layer 3, emerges from the side of the substrate 4 as a vertically linearly polarized light, and is injected to the other polarizer plate (analyzer) 6. The polarizer plate 6 has a transverse (horizontal) polarization axis P2, and hence blocks the vertically polarized light. Thus, the cell appears "dark".

In the ON state as shown in FIG. 7B, the liquid crystal molecules 10 change their direction by the electric field, except the regions very near to the substrates. Therefore, the incident light is subjected to annihilation of polarization or birefringence. There is generated such light component which transmits the rear polarizer plate (analyzer) 6. When the liquid crystal display device is observed from the direction normal to the liquid crystal display device, the cell appears "bright".

In the OFF state which is expected to exhibit a perfectly dark state, a nearly perfect dark state is observed when seen along the direction normal to the cell, but a good dark state cannot be obtained for those light rays incident on the cell along directions considerably off-set from the normal direction.

The reason why the visual recognition range of incidence angle is narrow will be analyzed hereinbelow referring to FIG. 8. Homeotropically oriented nematic liquid crystal molecules are aligned along a direction orthogonal to the substrate. Then, the liquid crystal layer 3 exhibits uniaxial anisotropy, as shown by a refractive index ellipsoid of FIG. 8, in which the refractive index in the optic axis direction is larger than those in the directions orthogonal to the optic axis i.e. positive optical anisotropy).

Figure 8:
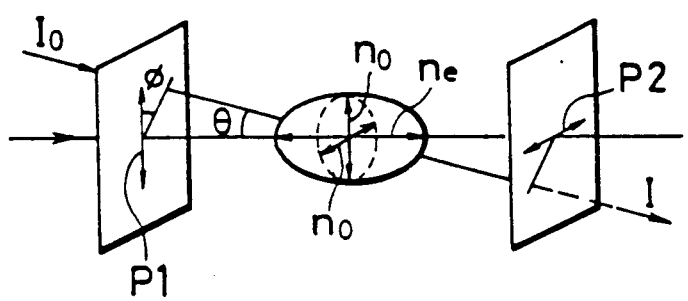
FIG.8 is a schematic perspective view of the prior art liquid crystal display device in the OFF state as shown in FIG. 7C, wherein the liquid crystal layer is shown as a refractive index ellipsoid.

In FIG. 8, $n_e = n_\parallel$, $n_o = n_\perp$, and $n_e > n_o$ where $n_{81}$ and $n_{195}$ represent the refractive indices along the long axis and the short axis of the liquid crystal molecule.

When ideal polarizers are used, the observed light intensity (emerging light intensity) I can be approximately represented as $$I = (\tfrac{1}{4}) I_0 \{1 - \cos(2\pi \Delta R/\lambda)\} \sin(2\phi) \quad (1)$$

where
$\Delta R = [\{N_e N_0/(N_e^2 \cos^2\theta + N_0^2 \sin^2\theta)^{\frac{1}{2}}\}] d/\cos\theta$.

(Here, $\Delta R$ is a quantity called retardation, $\lambda$ is the wavelength of light, d is the thickness of the liquid crystal layer, $I_o$ is the intensity of the incident light, and $\theta$ and $\phi$ are angles as shown in FIG. 8.

From equation (1), it can be seen that the amount of leakage light varies in accordance with the quantity $\Delta R$.

For example, when a liquid crystal available as ZLI-2806 from Merk Inc. is used as the homeotropic liquid crystal material having a negative dielectric anisotropy, the refractive indices are $n_e = n_\parallel = 1.520$ and $n_o = n_\perp = 1.476$.

As an example, in case of $\phi = 45°$, $n_\parallel = 1.520$, $n_{195} = 1.476$, $d = 10\mu m$ and $\lambda = 550$ nm, the retardation $\Delta R$ equals zero if $\theta = 0°$ (this direction coincides with the normal of the substrate) and equation (1) leads to $I(\theta = 0°) = 0$.

In case of $\theta = 30°$, however, equation (1) with corresponding parameter values leads to $I(\theta = 30°) = 0.2 I_o$.

Figure 9:
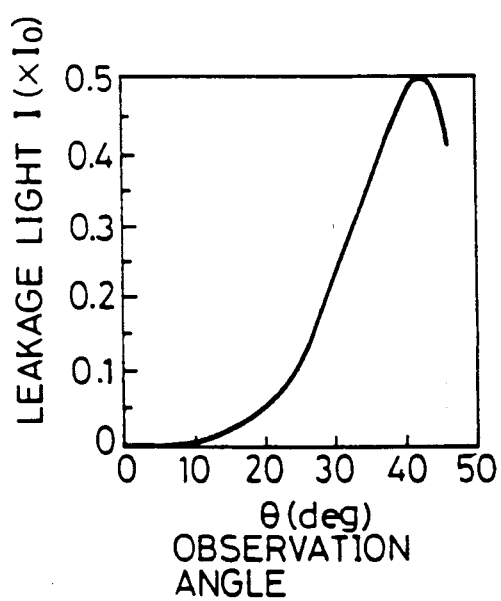
FIG. 9 is a graph of the leakage light vs. the slanted observation angle in the prior art liquid crystal display device as shown in FIGS. 7C and 8.

The relation between the observation direction (slanted observation angle $\theta$) and the intensity of the emerging light (leakage light) (1) as obtained in the above manner is shown in FIG. 9. In FIG. g, the abecissa represents the observation angle $\theta$ and the ordinate represents the emerging or leakage light quantity I. The emerging light quantity I rises around an angle $\theta$ near 10 degrees, increases from about 20 degrees, forms a peak of about 0.5 $I_o$ around 42 degrees, then decreases again and takes small values above about 45 degrees.

Now, a liquid crystal display device according to an embodiment of this invention will be described in connection with FIGS. 1A and 1B.

Figure 1B:
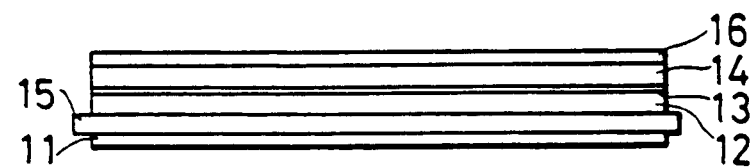
Figure 1C:
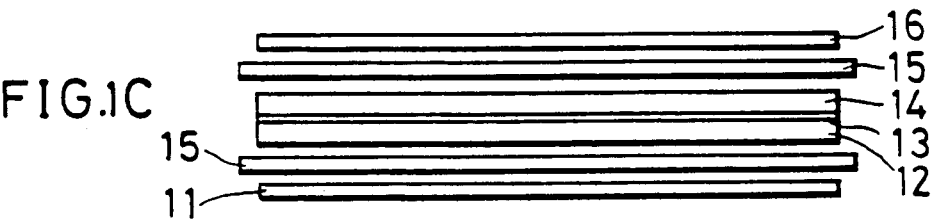

The thin film transistor homeotropic liquid crystal display device has a structure in which a liquid crystal cell is sandwiched between a pair of polarizer plates !1 and !6 as shown in FIGS. 1A, 1B, or 1C. The liquid crystal cell has a structure in which a layer 13 of nematic liquid crystal having a negative dielectric anisotropy Is sealed between a pair of substrates 12 and 14.

Figure 6:
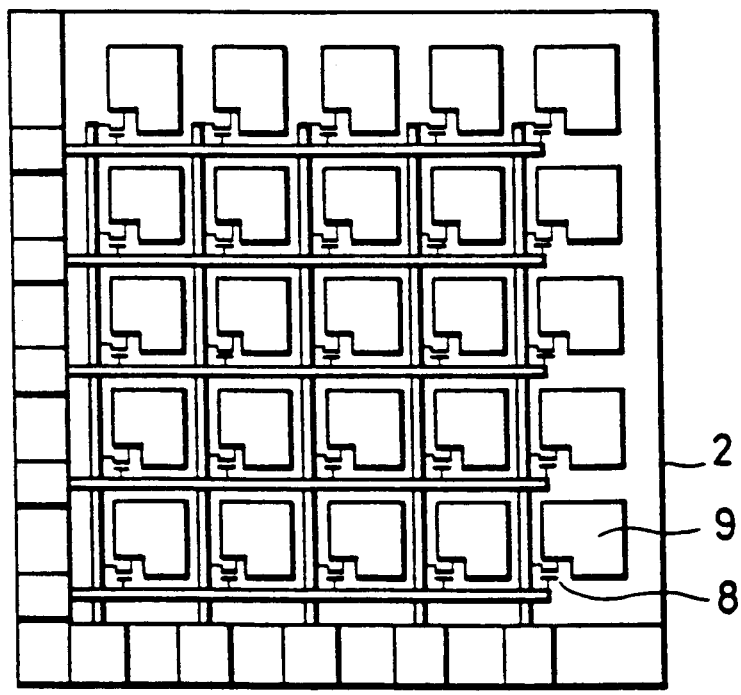
FIG. 6 is a plan view of a thin film transistor substrate to be used in the liquid crystal display device of FIGS. 1A to 1C.

One of the substrates 12 and 14 has a structure as shown in FIG. 6, in which thin film transistor 8 and display electrodes 9 are formed on a substrate. On the other substrate, an opposing common electrode is formed.

Anisotropy compensating means 15 is inserted between the polarizer 16 and the substrate 14 as shown in FIG. 1A, or between the polarizer 11 and the substrate 12 as shown in FIG. 1B, or partly between the polarizer 16 and the substrate 14 and partly between the polarizer 11 and the substrate 12 as shown in FIG. 1C. In the embodiment of FIG. 1C, the total effect of the anisotropy compensating means is equivalent to that of FIG. 1A or 1B. Hereinbelow, description will be made mainly on the disposition of FIG. 1A. The operation in the other dispositions will be apparent for those skilled in the art.

The anisotropy compensating means 15 comprises at least two films, each having optical anisotropy, relatively rotated by about 90 degrees to exhibit, in total, a negative optical anisotropy in a direction normal to the substrate. The anisotropy of each film may be uniaxial or biaxial, as will be described later.

Figure 2A:
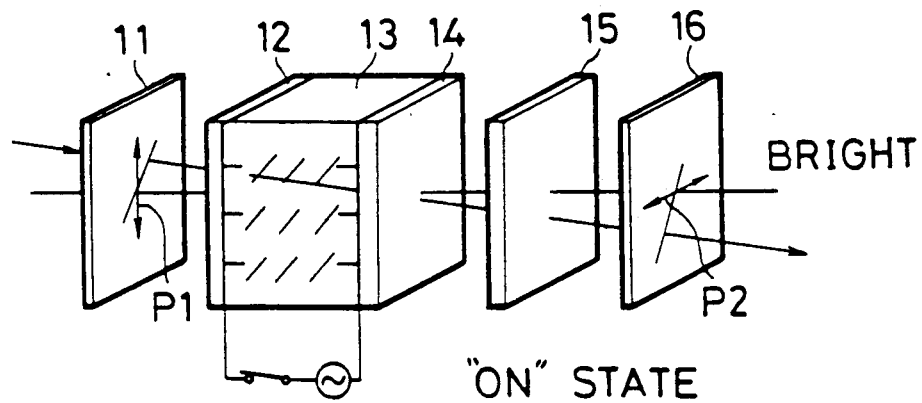
Figure 2B:
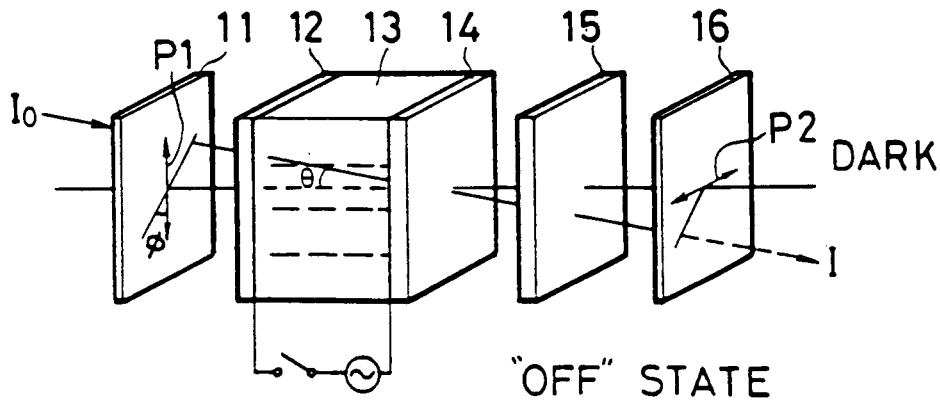

FIGS. 2A and 2B respectively show the states of the display cell in the ON state where an electric field is applied and in the OFF state where no electric field is applied. In the OFF state, the long axis directions of the nematic liquid crystal molecules are disposed normal to the substrate, similar to the liquid crystal molecules in the prior art homeotropic devices. The polarization state of light is not varied in the homeotropically oriented liquid crystal layer. In the ON state, the liquid crystal molecules deviate from the normal direction and create annihilation of polarization or birefringence. Then, there occur components which pass through the analyzer 16 after once polarized by the polarizer 11. Namely, the liquid crystal cell is "dark" in the OFF state, and is "bright" in the ON state.

Figures 3A, 3B:
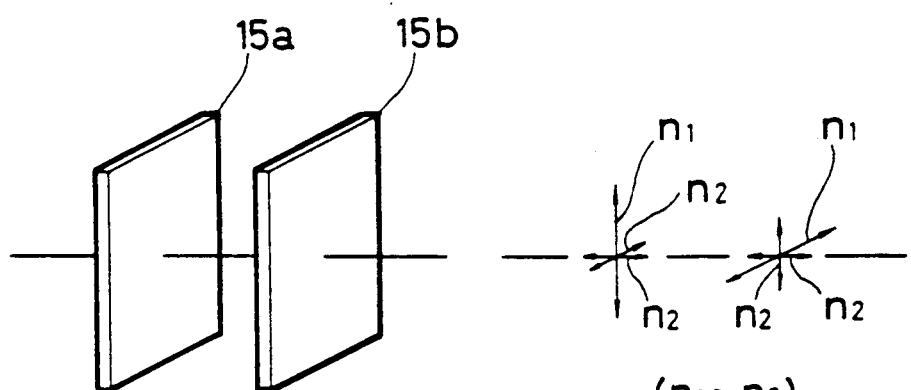
Figures 3C, 3D:
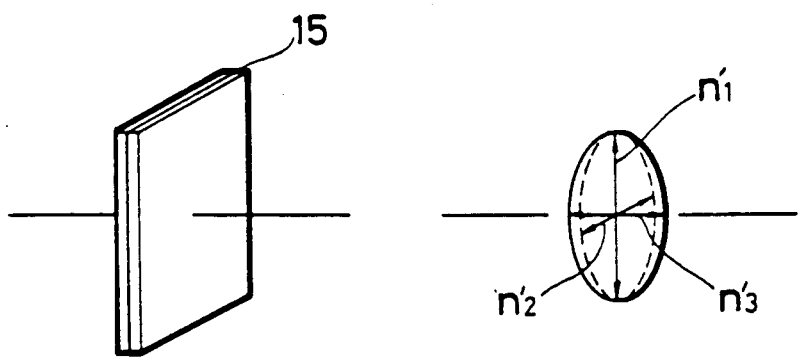

The anisotropy compensating means 15 is a combination of, for example, two uniaxial films 15a and 15b, each disposed in a plane parallel to the substrate and having optical anisotropy, relatively rotated by 90 degrees about the optic axis of the liquid crystal display device. As shown in FIG. 8B, the main axis of the refractive index $n_1$ is in the plane of the sheet and has a larger value than those for other two axes $n_2$. The two sheets may be stacked into a unitary body as shown in FIG. 3C. Here, let us assume that the films 15a and 15b have the same characteristics and have the refractive indices as shown in FIG. 3B, the effective refractive indices of the composite anisotropy compensating means 15 in the form of two separate sheets or in the form of a laminar film composed of two sheets of uniaxial films become, as shown in FIG. 3D, $n_1' = n_2' = (n_1 + n_2)/2$, and $n_3' = n_2$.

Therefore, the anisotropy compensating means 15 is uniaxial parallel to the optic axis as shown in FIG. 3D, with the relation $n_1' = n_2' > n_3'$.

Namely, there is formed an optically negative refractive index ellipsoid (negative optical activity).

Meanwhile, it will be obvious for those skilled in the art that an optically negative refractive index ellipsoid can also be produced by combining two sheets of biaxial films, or by combining more than two uniaxial or biaxial anisotropic sheets.

For example, when the biaxial film has refractive indices $n_1 > n_2 > n_3$, a combination of two sheets of such biaxial films with axes $n_1$ and $n_2$ interchanged will have the refractive indices $n_1'$, $n_2'$, and $n_3'$ which satisfy $n_1' = n_2' = (n_1 + n_2)/2 > n_3$.

Figure 4:
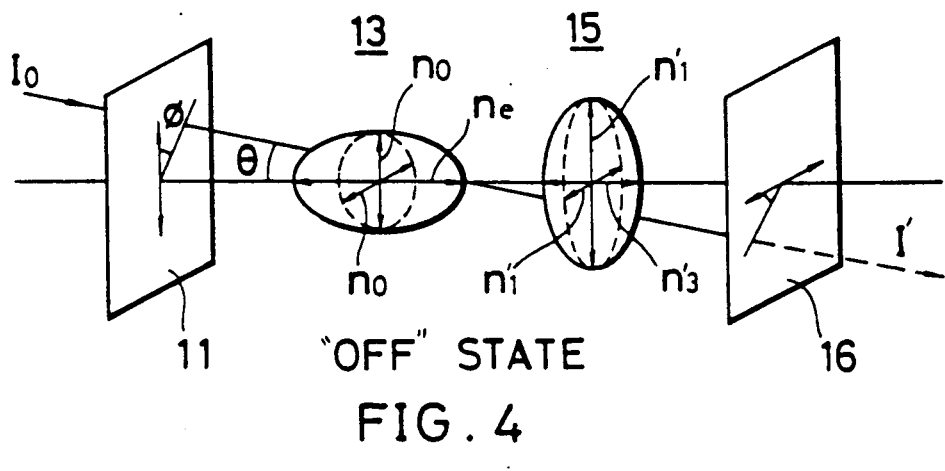
FIG. 4 is a schematic perspective view for illustrating the operation of the liquid crystal display device of FIG. 1A in the OFF state as shown in FIG. 2B, wherein the liquid crystal layer and the anisotropy compensating means are shown by refractive index ellipsoids.

The optical system of the liquid crystal display cell in the OFF state is shown in FIG. 4. In the figure, along the optic axis from the lefthand side to the righthand side, there are disposed the polarizer (polarizer plate) 11, the liquid crystal layer 13, the anisotropy compensating means 15 and the analyzer (polarizer plate) 16.

Here, letting $n_e = n_{81}$ (the refractive index along the long axis direction of the liquid crystal molecule), $n_o = n_{195}$ (the refractive index along the short axis direction of the liquid crystal molecule), d: the thickness of the liquid crystal layer, and d': the sum of thickness of, e.g. two sheets of anisotropic film in the anisotropy compensating means, the intensity of the emerging light I' along a direction 45 degrees slanted from the vertical direction in a plane parallel to the substrate and $\theta$ slanted from the normal of the substrate (or the optic axis) can be approximately represented as $$I' = (\tfrac{1}{2})I_0[1 - \cos\{2\pi(\Delta R')/\lambda\}]\sin(2\phi) \qquad (2)$$

where $\Delta R = [\{N_e N_0/(N_e^2\cos^2\theta + N_0^2\sin^2\theta)^{\frac{1}{2}}\} - N_0]d/\cos\theta$, $\Delta R' = [\{n_3'n_1'/(n_3'^2\cos^2\theta = n_1'^2\sin^2\theta)^{\frac{1}{2}}\} - n_1']d'/\cos\theta$.

When the properties of the anisotropy compensating means 15 are so selected to satisfy $\Delta R + \Delta R' = 0$ in equation (2), then it follows $I' = 0$.

Under these conditions, the leakage light in the OFF state becomes zero at any observation directions. Therefore, display with high contrast in wide range of observation angle can be provided.

In equation (2), a condition for reducing I' is approximately represented as $(n_e - n_o) d + (n_3' - n_1')d' = 0$, which leads to $$(n_e - n_o)d + (n_2 - n_1)d'' = 0 \qquad (3),$$

where $d'' (= d'/2)$ is the thickness of each sheet of film 15a or 15b.

For example, when a homeotropically oriented nematic liquid crystal material comprises ZLI-2806 available from Merk Inc., then $n_e = 1.520$ and $n_o = 1.476$.

When the properties of the liquid crystal layer are $n_e = 1.520 (= n_{81})$, $n_o = 1.476 (= n_\perp)$, and $d = 10$ μm , and if the properties of the uniaxial film constituting the anisotropy compensating means are $n_1 = 1.65$, and $n_2 = 1.64$, good performance will be provided by selecting the thickness d'' as $d'' = (1.520 - 1.476) \times 10/(1.65 - 1.64) = 44$ μm.

An example of such uniaxial film is a polyether-sulfone film appropriately elongated (pulled) uniaxially. Beside this material, an anisotropy compensating means having similar characteristics can be constituted with highly transparent plastic films such as polyethyleneterephthalate, polyetherimide, polyether ether-ketone.

Figure 5:
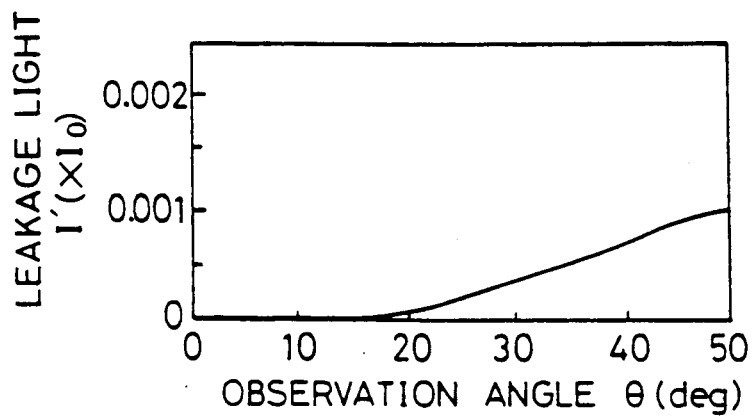
FIG. 5 is a graph showing the relation of the emerging light intensity I with respect to the slant observation angle $\theta$ in the OFF state of the liquid crystal display device shown in FIGS. 2B and 4.

The relation between the observation direction and the intensity of leakage light I' in the above-described case is shown in FIG. 5. In FIG. 8, the abscissa represents the slanted observation angle $\theta$ and the ordinate represents the intensity of emerging light. Since the intensity of the emerging light (leakage light) is very small, the ordinate is expanded 100 times as compared to that of FIG. 9 which shows the prior art performance.

The intensity of the emerging light I slightly increases from about an observation angle of 10 degrees, but is still at most about 0.0009 $I_o$ around 45 degrees. It is clearly seen that the leakage light has been significantly reduced as compared to the prior art of FIG. 9 which shows a peak leakage of about 0.5 $I_o$ at about 42 degrees.

Although description has been made on the embodiments of this invention, it should not be interpreted in and restrictive meaning. For example, various alterations, modifications and/or combinations can be made within the scope of the appended claims.

We claim:

1. A homeotropic liquid crystal display device comprising:
   a homeotropic liquid crystal cell including a pair of parallel substrates provided with electrodes and a nematic liquid crystal layer sandwiched between the pair of substrates, wherein liquid crystal molecules of said liquid crystal cell have a negative dielectric anisotropy, are oriented substantially orthogonal to the substrate in the absence of an electric field exhibiting a positive optical anisotropy, and are deviated from the orthogonal direction when a voltage is applied between the electrodes thereby exhibiting birefringence;
   a pair of crossed polarizers disposed to sandwich the homeotropic liquid crystal cell, said polarizers having polarization axes mutually crossing orthogonally; and
   anisotropy compensating means disposed between the liquid crystal cell and at least one of the polarizers, said compensating means including at least two sheets of anisotropic film, the optic axes of said two sheets of film being relatively rotated to make an angle of about 90 degrees in a plane parallel to the substrate, and exhibiting, in total, a negative optical anisotropy with an axis along the normal of the substrate which compensates the positive optical anisotropy of the liquid crystal layer when oriented homeotropically.

2. A home tropic liquid crystal display device according to claim 1, wherein said at least two sheets of anisotropic film are optionally uniaxial along a direction in the plane of sheet 3. A homeotropic liquid crystal display device according to claim 1, wherein said at least two sheets of anisotropic film are optically biaxial with an axis of the smallest refractive index oriented substantially normal to the plane of sheet.

4. A homeotropic liquid crystal display device according to claim 1, wherein said at least two sheets of anisotropic film are assembled in a laminar structure.

5. A homeotropic liquid crystal display device according to claim 2, wherein said at least two sheets of anisotropic film are formed of a material selected from the group consisting of polyether sulfone, polyethyleneterephthalate, polyether-imide, polyether-ether-ketone, and their combinations.

* * * * *